United States Patent
Jiang

(10) Patent No.: US 12,475,463 B2
(45) Date of Patent: Nov. 18, 2025

(54) DISTRIBUTED TRANSACTION PROCESSING METHOD, SYSTEM, AND RELATED DEVICE

(71) Applicant: Huawei Cloud Computing Technologies Co., Ltd., Guizhou (CN)

(72) Inventor: Yu Jiang, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 115 days.

(21) Appl. No.: 18/474,695

(22) Filed: Sep. 26, 2023

(65) Prior Publication Data

US 2024/0013218 A1 Jan. 11, 2024

Related U.S. Application Data

(63) Continuation of application No. PCT/CN2022/081655, filed on Mar. 18, 2022, and a continuation-in-part of application No. PCT/CN2022/081697, filed on Mar. 18, 2022.

(30) Foreign Application Priority Data

Mar. 30, 2021 (CN) .......................... 202110342631.1
Mar. 30, 2021 (CN) .......................... 202110343752.8

(51) Int. Cl.
*G06F 17/00* (2019.01)
*G06Q 20/38* (2012.01)
*G06Q 20/40* (2012.01)

(52) U.S. Cl.
CPC ....... *G06Q 20/4014* (2013.01); *G06Q 20/389* (2013.01)

(58) Field of Classification Search
CPC .............. G06Q 20/4014; G06Q 20/389; G06F 16/2343
See application file for complete search history.

(56) References Cited

U.S. PATENT DOCUMENTS

| 9,952,947 | B2 * | 4/2018 | Feng | .................... G06F 11/2028 |
| 10,846,185 | B2 * | 11/2020 | Feng | ........................ G06F 11/16 |
| 11,243,920 | B2 * | 2/2022 | Xiao | .......................... G06F 9/52 |
| 11,620,277 | B2 * | 4/2023 | Zhang | ................. G06F 16/2379 |
| | | | | 707/682 |
| 2007/0073621 | A1 * | 3/2007 | Dulin | ...................... G06F 21/33 |
| | | | | 705/50 |

(Continued)

OTHER PUBLICATIONS

Chunzhi Su, Natacha Crooks, Cong Ding, Lorenzo Alvisi, and Chao Xie. Bringing Modular Concurrency Control to the Next Level. In Proceedings of the 2017 ACM International Conference on Management of Data. Association for Computing Machinery, 283-297. <https://doi.org/10.1145/3035918.3064031>, May (Year: 2017).*

*Primary Examiner* — Greta L Robinson
(74) *Attorney, Agent, or Firm* — Conley Rose, P.C.

(57) ABSTRACT

A method includes a first lock server in a lock server cluster sending, based on a transaction coordinator list, a request for obtaining lock data to each transaction coordinator in a transaction coordinator list. If the lock data sent by each transaction coordinator in the transaction coordinator list is obtained, the first lock server processes a lock request sent by the transaction coordinator in the transaction coordinator cluster.

20 Claims, 5 Drawing Sheets

(56) References Cited

U.S. PATENT DOCUMENTS

2012/0310881 A1* 12/2012 Shadmon .............. G06F 16/273
                                                                       707/613
2018/0075083 A1    3/2018  Lee et al.
2018/0234503 A1*  8/2018  Lan ........................... G06F 9/52

* cited by examiner

DISTRIBUTED TRANSACTION PROCESSING METHOD, SYSTEM, AND RELATED DEVICE

CROSS-REFERENCE TO RELATED APPLICATIONS

This is a continuation of International Patent Application No. PCT/CN2022/081655 filed on Mar. 18, 2022, which claims priority to Chinese Patent Application No. 202110342631.1 filed on Mar. 30, 2021. Also, this is a continuation of International Patent Application No. PCT/CN2022/081697 filed on Mar. 18, 2022, which claims priority to Chinese Patent Application No. 202110343752.8 filed on Mar. 30, 2021. All of the aforementioned applications are hereby incorporated by reference in their entireties.

TECHNICAL FIELD

This disclosure relates to the field of database technologies, and in particular, to a distributed transaction processing method and system, and a related device.

BACKGROUND

With rapid development of network technologies, a distributed system is increasingly common. Based on a microservice architecture, the distributed system deploys a plurality of services in different areas or different nodes. A transaction operation may be completed between services through remote collaboration. For example, when a transfer operation of transferring 100 yuan from an account a of a bank A to an account b of a bank B needs to be implemented, a first service needs to be invoked to deduct 100 yuan from a balance of the account a in a database of the bank A, and a second service needs to be invoked to increase 100 yuan to a balance of the account b in a database of the bank B. A transaction in which the distributed system operates a plurality of independent databases to complete a task is referred to as a distributed transaction or a global transaction.

During distributed transaction processing, an acquire lock operation or an unlock operation may be performed on data that participates in the transaction, to prevent a conflict when concurrent distributed transactions modify a same row of data. For example, when the foregoing transfer operation is performed, it is necessary to perform an acquire lock operation on data of the account a and data of the account b, and after the transfer ends, an unlock operation on the data of the account a and the data of the account b is performed. Therefore, in the distributed transaction, locking or unlocking data is a very frequent operation. Lock data in the distributed transaction may be stored in a database. To prevent a loss of the lock data and improve reliability, the lock data needs to be backed up, and is synchronously duplicated from a primary node to a secondary node. When the primary node is faulty, the lock data is obtained from the secondary node. However, synchronous duplication of the lock data causes high performance overheads.

SUMMARY

Embodiments of this disclosure disclose a distributed transaction processing method and system, and a related device, to reduce performance overheads in a distributed transaction processing process, and improve distributed transaction processing efficiency.

According to a first aspect, an embodiment of this disclosure provides a distributed transaction processing method, where the method is applied to a distributed system, the distributed system includes a lock server cluster and a transaction coordinator cluster, a transaction coordinator in the transaction coordinator cluster is configured to control a distributed transaction processing process, and the distributed transaction processing process includes a lock operation on a database related to a distributed transaction.

A first lock server in the lock server cluster sends a request for obtaining lock data to each transaction coordinator in a transaction coordinator list based on the transaction coordinator list; and when obtaining the lock data sent by each transaction coordinator in the transaction coordinator list, the first lock server processes a lock request sent by the transaction coordinator in the transaction coordinator cluster.

According to the method in this embodiment of this disclosure, the lock server cluster is used in the distributed system to process an acquire lock request, an unlock request, and the like in the distributed transaction. Each lock server in the lock server cluster can send an obtaining request to a lock server in the transaction coordinator list based on the transaction coordinator list, and obtain the lock data included in each transaction coordinator in the transaction coordinator list, without backing up the lock data. Therefore, lock data in a secondary node does not need to be updated each time after an acquire lock operation or an unlock operation is performed, reducing performance consumption in the distributed transaction processing process. In addition, it is unnecessary to return an acquire lock result or an unlock result to a database server after lock data in a primary node and the secondary node is updated each time locking or unlocking is performed. Therefore, a delay in the distributed transaction processing process can be reduced, holding time of a transaction lock can be reduced, and transaction processing efficiency can be improved.

In a specific implementation, the transaction coordinator list is synchronized by a second lock server to the first lock server, the transaction coordinator list records a transaction coordinator actively performing a lock operation, and before the first lock server sends the request for obtaining the lock data to each transaction coordinator in the transaction coordinator list, the second lock server is a primary lock server that processes the lock request sent by the transaction coordinator in the transaction coordinator cluster.

The transaction coordinator list is maintained in the primary lock server. The transaction coordinator list records a transaction coordinator to which the lock data stored in the primary lock server belongs. After updating the transaction coordinator list each time, the primary lock server synchronizes the updated transaction coordinator list to a secondary lock server. In this way, when the primary lock server is faulty in the lock server cluster, a newly elected primary lock server can obtain the lock data from the transaction coordinator based on the transaction coordinator list, and quickly recover full lock data in the primary lock server when a fault occurs.

In a specific implementation, the first lock server processes the lock request sent by the transaction coordinator in the transaction coordinator cluster includes: the first lock server receives an acquire lock request sent by a first transaction coordinator in the transaction coordinator cluster; when the transaction coordinator list does not include an identifier (ID) of the first transaction coordinator, the first lock server adds the ID of the first transaction coordinator to the transaction coordinator list, to obtain an updated transaction coordinator list; the first lock server synchronizes the updated transaction coordinator list to other lock servers in the lock server cluster; and when determining that the updated transaction coordinator list is successfully synchronized to a preset proportion of lock servers in the other lock servers, the first lock server performs the acquire lock operation based on the acquire lock request, and stores lock data obtained through the acquire lock operation to a storage area of the first lock server.

The transaction coordinator list is maintained in the primary lock server. The transaction coordinator list records the transaction coordinator to which the lock data stored in the primary lock server belongs. After the primary lock server receives the lock data sent by the transaction coordinator each time, if the transaction coordinator list does not include the transaction coordinator, the ID of the transaction coordinator is added to the transaction coordinator list to update the transaction coordinator list. After the transaction coordinator list is updated each time, the updated transaction coordinator list is synchronized to the secondary lock server. In this way, when the primary lock server is faulty in the lock server cluster, the newly elected primary lock server can obtain the lock data from the transaction coordinator based on the transaction coordinator list, and quickly recover the full lock data in the primary lock server when the fault occurs. It should be understood that when the primary lock server determines that the updated transaction coordinator list is successfully synchronized to a preset proportion of lock servers in other lock servers, for example, the preset proportion is greater than 0.5, it may be considered that the updated transaction coordinator list is successfully synchronized.

In a specific implementation, the method further includes: when determining that the updated transaction coordinator list is not synchronized to the preset proportion of lock servers in the other lock servers, the first lock server sends an acquire lock failure message to the first transaction coordinator, and deletes the ID of the first transaction coordinator from the updated transaction coordinator list.

In a specific implementation, when the transaction coordinator list includes the ID of the first transaction coordinator, the first lock server performs the acquire lock operation based on the acquire lock request, and stores the lock data obtained through the acquire lock operation to the storage area of the first lock server.

In a specific implementation, before that the first lock server processes a lock request sent by the transaction coordinator in the transaction coordinator cluster, the method further includes: the first lock server sends a first indication message to the transaction coordinator in the transaction coordinator cluster, where the first indication message indicates the transaction coordinator in the transaction coordinator cluster to send the lock request to the first lock server.

In a specific implementation, before the sending the request for obtaining the lock data to each transaction coordinator in the transaction coordinator list, the method further includes: the first lock server receives, within preset duration, no heartbeat packet sent by the second lock server. When receiving no heartbeat packet of the primary lock server, the first lock server can obtain the lock data in the transaction coordinator cluster in time based on the transaction coordinator list, become a new primary lock server, and further receive and process the lock request of the transaction coordinator in the transaction coordinator cluster, preventing the lock request of the distributed transaction from being unable to be processed after the primary lock server is faulty, so that performance of the distributed system can be improved.

In a specific implementation, the first lock server is a candidate primary lock server selected from the lock server cluster based on a preset algorithm, and the preset algorithm may be any one of consensus algorithms such as a raft algorithm or a paxos algorithm.

In a specific implementation, the method further includes: when receiving no lock data sent by a second transaction coordinator in the transaction coordinator list, the first lock server sends the obtaining request to a third transaction coordinator in the transaction coordinator list, where the third transaction coordinator includes a backup of the lock data in the second transaction coordinator; and the first lock server receives the lock data that is included in the second transaction coordinator and sent by the third transaction coordinator.

Each transaction coordinator in the transaction coordinator cluster backs up the lock data in another transaction coordinator, to prevent the lock server from being unable to become the primary lock server after no data in the transaction coordinator cluster is obtained. The lock server cluster repeatedly obtains the lock data from the transaction coordinator. This reduces distributed system performance.

According to a second aspect, an embodiment of this disclosure provides a distributed transaction processing system, the distributed system includes a lock server cluster and a transaction coordinator cluster, a transaction coordinator in the transaction coordinator cluster is configured to control a distributed transaction processing process, and the distributed transaction processing process includes a lock operation on a database related to a distributed transaction.

A first lock server in the lock server cluster sends, based on a transaction coordinator list, a request for obtaining lock data to each transaction coordinator in the transaction coordinator list.

Each transaction coordinator in the transaction coordinator list is configured to send respective stored lock data to the first lock server.

After obtaining the lock data sent by each transaction coordinator in the transaction coordinator list, the first lock server is further configured to process a lock request sent by the transaction coordinator in the transaction coordinator cluster.

In a specific implementation, the transaction coordinator list is synchronized by a second lock server to the first lock server, the transaction coordinator list records a transaction coordinator actively performing the lock operation, and before the first lock server sends the request for obtaining the lock data to each transaction coordinator in the transaction coordinator list, the second lock server is a primary lock server that processes the lock request sent by the transaction coordinator in the transaction coordinator cluster.

In a specific implementation, that after obtaining the lock data sent by each transaction coordinator in the transaction coordinator list, the first lock server is further configured to process a lock request sent by the transaction coordinator in the transaction coordinator cluster includes: receiving an acquire lock request sent by a first transaction coordinator in the transaction coordinator cluster; when the transaction coordinator list does not include an ID of the first transaction coordinator, adding the ID of the first transaction coordinator to the transaction coordinator list, to obtain an updated transaction coordinator list; synchronizing the updated transaction coordinator list to other lock servers in the lock server cluster; and when determining that the updated transaction coordinator list is successfully synchronized to a preset proportion of lock servers in the other lock servers, performing the acquire lock operation based on the acquire lock request, and storing lock data obtained through the acquire lock operation to a storage area of the first lock server.

In a specific implementation, the first lock server is further configured to: when determining that the updated transaction coordinator list is not synchronized to the preset proportion of lock servers in the other lock servers, send an acquire lock failure message to the first transaction coordinator, and delete the ID of the first transaction coordinator from the updated transaction coordinator list.

In a specific implementation, the first lock server is further configured to: when the transaction coordinator list includes the ID of the first transaction coordinator, perform the acquire lock operation based on the acquire lock request, and store the lock data obtained through the acquire lock operation to the storage area of the first lock server.

In a specific implementation, before that the first lock server processes a lock request sent by the transaction coordinator in the transaction coordinator cluster, the first lock server is further configured to: send a first indication message to the transaction coordinator in the transaction coordinator cluster, where the first indication message indicates the transaction coordinator to send the lock request to the first lock server.

In a specific implementation, before that a first lock server sends a request for obtaining lock data to each transaction coordinator in the transaction coordinator list, the system further includes: the first lock server receives, within preset duration, no heartbeat packet sent by the second lock server.

In a specific implementation, the first lock server is a candidate primary lock server selected from the lock server cluster based on a preset algorithm.

In a specific implementation, the first lock server is further configured to: when receiving no lock data sent by a second transaction coordinator in the transaction coordinator list, send the obtaining request to a third transaction coordinator in the transaction coordinator list, where the third transaction coordinator includes a backup of the lock data in the second transaction coordinator; and receive the lock data that is included in the second transaction coordinator and sent by the third transaction coordinator.

According to a third aspect, an embodiment of this disclosure provides a distributed transaction processing apparatus. The apparatus includes a unit configured to perform the method according to the first aspect or any specific implementation of the first aspect.

In a fourth aspect, an embodiment of this disclosure provides a computing device, including a processor and a memory, where the memory is configured to store instructions, and the processor is configured to execute the instructions. When the processor executes the instructions, the method according to the first aspect or any one of specific implementations of the first aspect is performed.

In a fifth aspect, an embodiment of this disclosure provides a computer-readable storage medium, where the computer-readable storage medium stores computer program instructions. When the computer program instructions are run on a device, the method according to the first aspect or any specific implementation of the first aspect is performed.

In a sixth aspect, an embodiment of this disclosure provides a computer program product, where the computer program product includes computer instructions. When the computer instructions are executed by a computing device, the computing device performs the method according to the first aspect or any one of specific implementations of the first aspect. The computer program product may be a software installation package. When the method according to the first aspect or any one of specific implementations of the first aspect needs to be used, the computer program product may be downloaded and executed by the computing device.

In this disclosure, based on implementations according to the foregoing aspects, the implementations may be further combined to provide more implementations.

BRIEF DESCRIPTION OF DRAWINGS

To describe technical solutions in embodiments of this disclosure more clearly, the following briefly introduces the accompanying drawings for describing embodiments. Obviously, the accompanying drawings in the following descriptions show some embodiments of this disclosure, and a person of ordinary skill in the art may still derive other drawings from these accompanying drawings without creative efforts.

DESCRIPTION OF EMBODIMENTS

The following describes a distributed transaction implementation method and a distributed system provided in embodiments of this disclosure with reference to the accompanying drawings. A transaction refers to an operation task for accessing or updating data in a database. In some centralized applications, the transaction is limited to accessing a single database resource. This type of transaction is called a local transaction. In microservice-based distributed application, one service usually needs to invoke a plurality of microservices, and the plurality of microservices usually correspond to a plurality of local database transactions. When one service needs to invoke a plurality of microservices to implement the plurality of local database transactions, a distributed transaction is required to ensure data consistency of the plurality of local database transactions.

The distributed transaction is a transaction that needs to operate a plurality of independent databases to complete one service together. One distributed transaction may include a plurality of branch transactions. The distributed transaction is responsible for coordinating branch transactions managed by the distributed transaction to reach an agreement. The branch transactions are either committed successfully or rolled back upon failure. Generally, each branch transaction is a local transaction of a relational database. For example, a user initiates a transfer service by using a terminal, to transfer 100 yuan from an account a of a bank A to an account b of a bank B. The service needs to separately operate data in a database of the bank A and data in a database of the bank B. The service needs to invoke a first service to complete an operation of deducting 100 yuan from the account a in the database of the bank A, and invoke a second service to complete an operation of increasing 100 yuan to the account b in the database of the bank B. A database operation that needs to be performed for invoking the first service is one branch transaction, and a database operation that needs to be performed for invoking the second service is another branch transaction. The distributed transaction is usually a global transaction across a plurality of areas or a plurality of databases. Therefore, the distributed transaction in this disclosure is also referred to as the global transaction. In descriptions of embodiments of this disclosure, the global transaction represents one distributed transaction.

Figure 1:
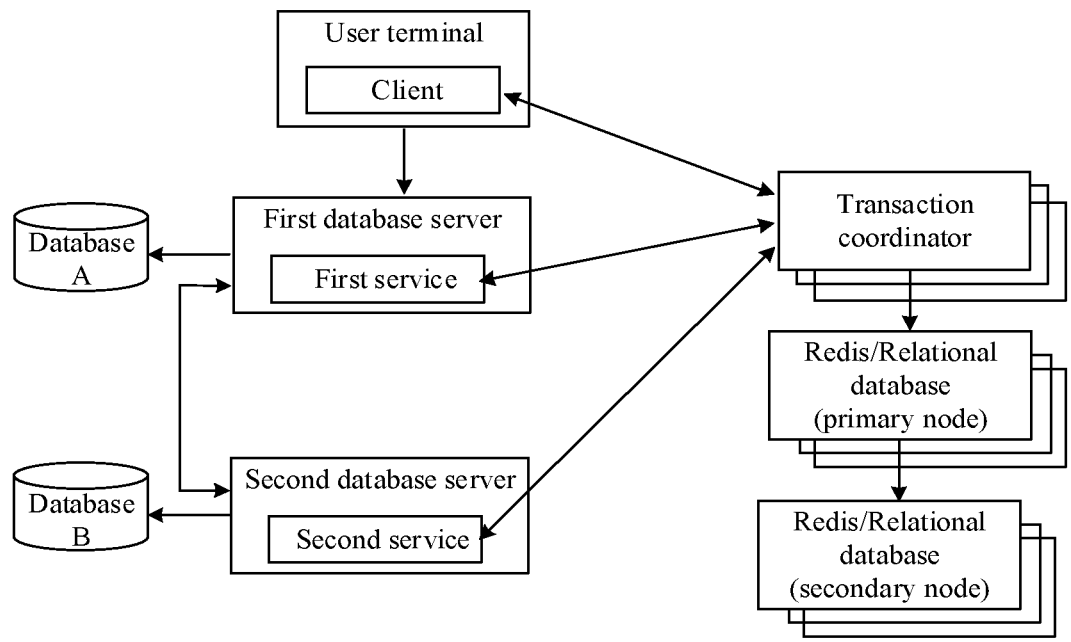
FIG. 1 is a schematic diagram of a distributed system.

The distributed system for implementing the distributed transaction includes one or more user terminals on which a client is deployed, one or more transaction coordinators, and one or more database servers that provide services (for example, microservices). FIG. 1 is a schematic diagram of a distributed system. The distributed system includes a user terminal, a first database server, a second database server, a transaction coordinator, a database A, and a database B. In a distributed transaction processing process, when needing to initiate a distributed transaction, a client selects a transaction coordinator based on a load balancing policy. The client initiates a distributed transaction request to the transaction coordinator, and the transaction coordinator creates a global transaction ID and returns the global transaction ID to the client. The global transaction ID uniquely identifies one distributed transaction. The client completes branch transactions corresponding to services by invoking the services located in different database servers. For example, to perform the foregoing transfer operation, a first service in a first database needs to be invoked to deduct 100 yuan from a balance of an account a in the database A, and a second service in a second database needs to be invoked to increase 100 yuan to a balance of an account b in the database B. For each branch transaction, when executing the branch transaction, the database server sends lock data of an operated database resource (that is, data in a database) to the transaction coordinator, and the transaction coordinator locks one or more rows of data in the database based on the lock data. This prevents a plurality of distributed transactions from concurrently modifying a same row of data in a same database and sending a message indicating successful locking to the database server. Currently, a remote dictionary server (Redis) or a relational database is used for locking. In other words, lock data is stored in the Redis or the relational database, where the lock data includes a group of key-value pairs. The key includes an ID of a row in which data that needs to be locked is located, a name of a table in which the row is located, and a name of a database in which the table is located, and the value is the global transaction ID of the distributed transaction. To prevent loss of the lock data and improve reliability, the lock data needs to be backed up, and is synchronously duplicated from a primary node to a secondary node, in other words, the lock data is duplicated from one database to another database synchronously. However, the synchronous duplication of the lock data in this way brings great performance overheads and affects distributed transaction processing efficiency.

Figure 2:
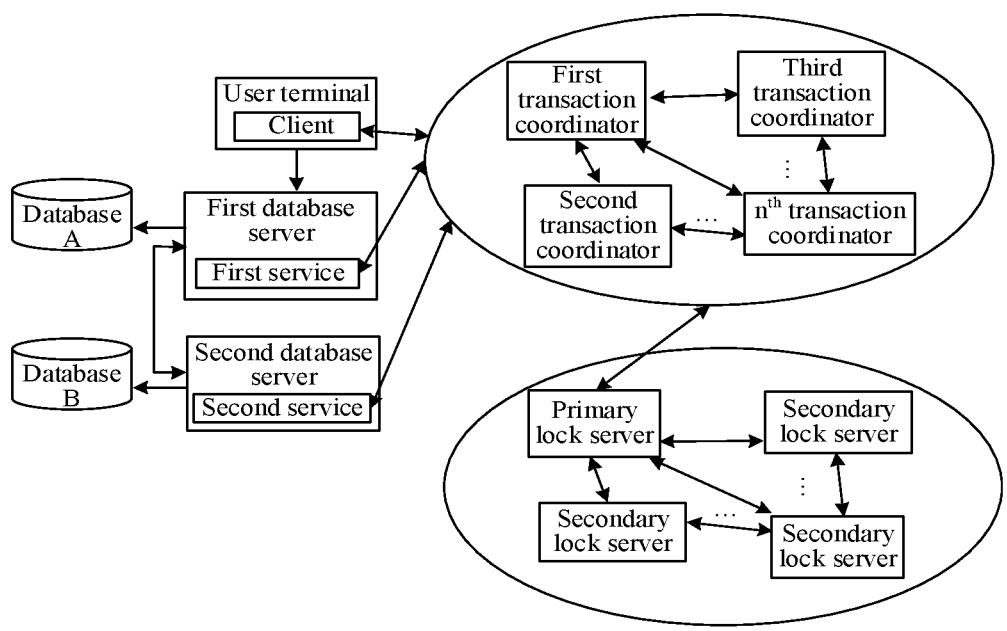
FIG. 2 is a schematic diagram of a distributed system according to an embodiment of this disclosure.

An embodiment of this disclosure provides a distributed system. The distributed system includes one or more user terminals on which a client is deployed, one or more database servers that provide services (for example, microservices), a transaction coordinator cluster including a plurality of transaction coordinators, and a lock server cluster including a plurality of lock servers. The transaction coordinators in the transaction coordinator cluster are configured to control a distributed transaction processing process, where the distributed transaction processing process includes a lock operation on a database related to a distributed transaction. The lock servers in the lock server cluster are configured to process lock requests sent by the transaction coordinators in the transaction coordinator cluster, for example, acquire lock requests and unlock requests. FIG. 2 is a schematic diagram of a distributed system according to an embodiment of this disclosure. In the distributed system, the foregoing lock server cluster includes one primary lock server and a plurality of secondary lock servers. When the foregoing transaction coordinator receives the lock data sent by the database server, the lock data is sent to the primary lock server, and the primary lock server locks, based on the lock data, a resource (that is, data in a database) operated by the database server, and stores the lock data in a storage area. Then, the primary lock server sends a message indicating successful locking to the transaction coordinator, records the transaction coordinator that sends the lock data in a transaction coordinator list of the primary lock server, and further synchronizes the transaction coordinator list to other secondary lock servers. In this way, when the primary lock server is faulty, a new primary lock server elected from the secondary lock servers can obtain the lock data from the transaction coordinator based on the transaction coordinator list. The transaction coordinator list records a transaction coordinator actively performing a lock operation. The transaction coordinator actively performing the lock operation means that the transaction coordinator sends the lock data to the primary lock server, and the sent lock data still exists in the primary lock server. The storage area of the lock server refers to a component that stores a program and data in the lock server, and is storage space, for example, a memory, that can be directly addressed by a processor of the lock server.

Figure 3A:
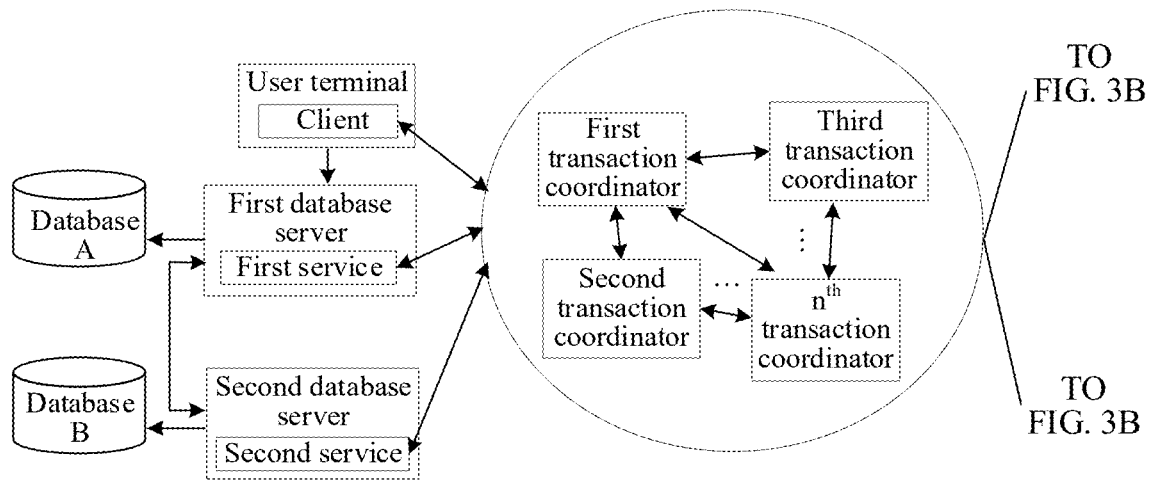
FIG. 3A and FIG. 3B are a schematic diagram of another distributed system according to an embodiment of this disclosure.
Figure 3B:
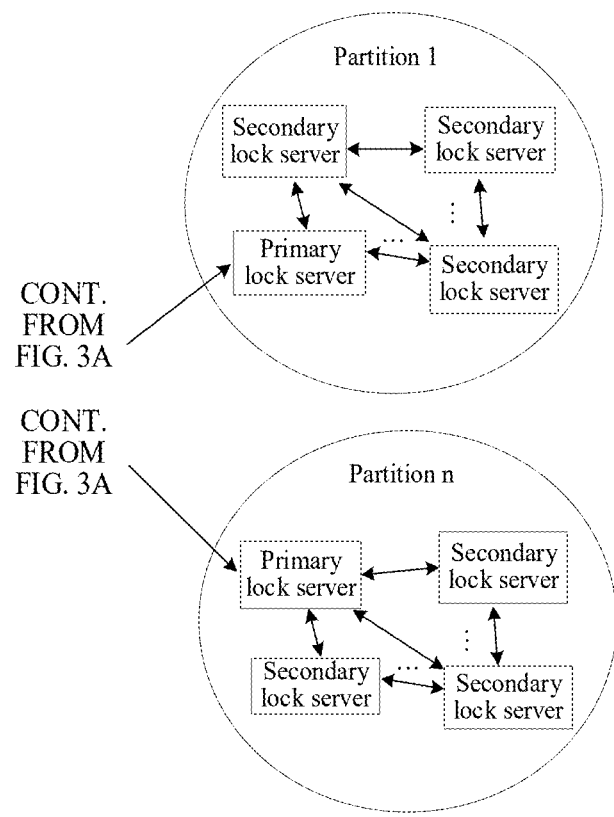

FIG. 3A and FIG. 3B are a schematic diagram of another distributed system according to an embodiment of this disclosure. In the schematic diagram of the distributed system, to improve efficiency of a lock server in processing a lock request, a plurality of lock servers is divided into a plurality of partitions, and each partition includes one primary lock server and a plurality of secondary lock servers. After receiving lock data, a transaction coordinator selects one partition based on a load balancing policy and sends the lock data to the primary lock server of the one partition to implement locking.

Figure 4:
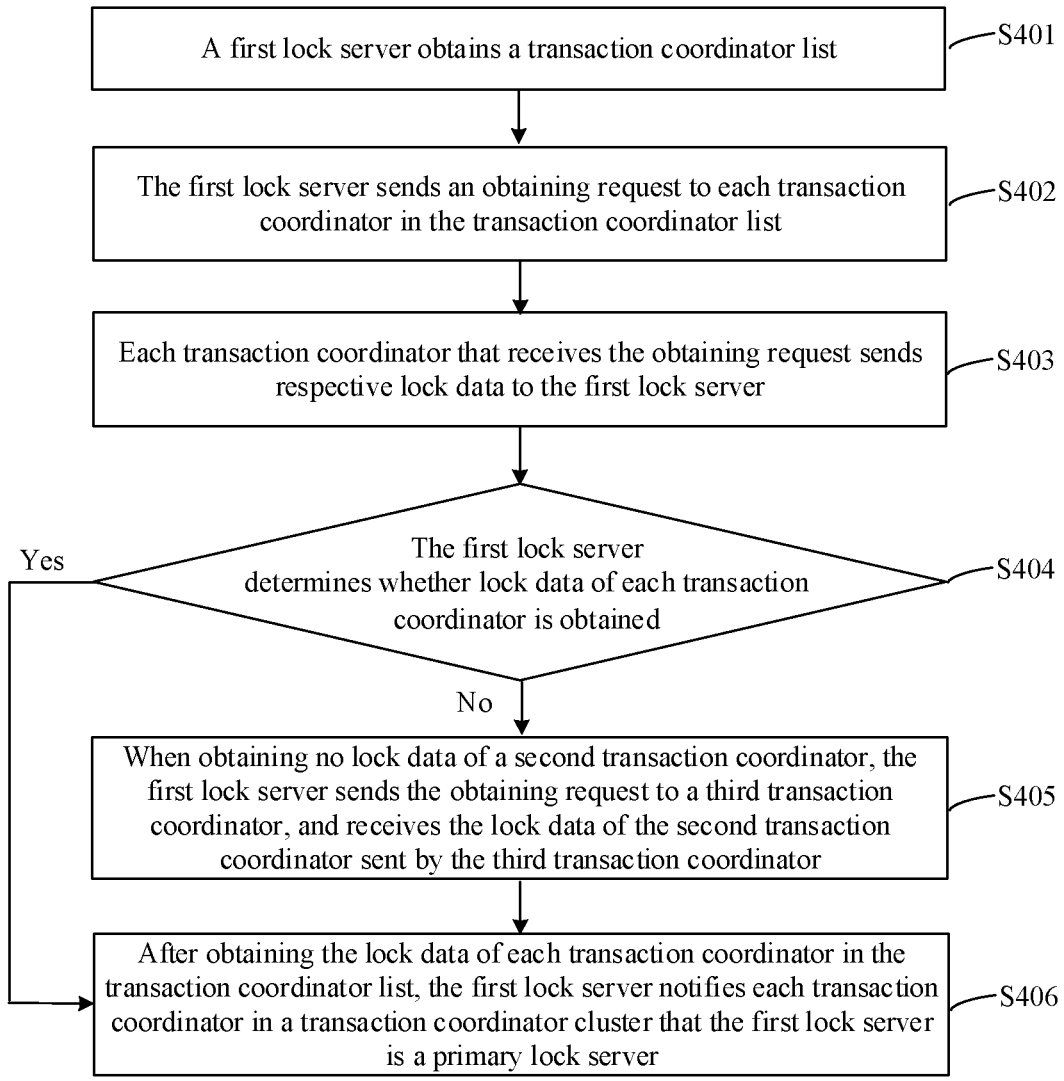
FIG. 4 is a schematic flowchart of determining a primary lock server according to an embodiment of this disclosure.

The following describes the distributed system and a method for implementing locking based on the distributed system provided in embodiments of this disclosure with reference to the accompanying drawings. A method for determining a primary lock server in a plurality of lock servers in one partition is first described. FIG. 4 is a schematic flowchart of determining a primary lock server according to an embodiment of this disclosure. The method for determining the primary lock server includes S401 to S406. It should be noted that when all lock servers in a lock server cluster are restarted, or when an original primary lock server in a lock server cluster is faulty, the following operations of determining the primary lock server in S401 to S406 are performed.

S401: A first lock server obtains a transaction coordinator list.

The first lock server is a candidate primary lock server selected by the lock server cluster by using a preset algorithm (for example, a raft algorithm, a paxos algorithm, or another consensus algorithm). After being elected as the candidate primary lock server, the first lock server obtains a transaction coordinator list before the lock server cluster elects the first lock server as the candidate primary lock server, and obtains transaction coordinator data of transaction coordinators included in the transaction coordinator list. The transaction coordinator list is synchronized by a second lock server to the first lock server, where the second lock server is a primary lock server before the first lock server is elected as the candidate primary lock server. The transaction coordinator data includes address information of each transaction coordinator in the transaction coordinator list. The transaction coordinator list includes some or all transaction coordinators in the foregoing transaction coordinator cluster. The preset algorithm may be the raft algorithm, the paxos algorithm, or the other consensus algorithm. This is not limited in this embodiment of this disclosure.

S402: The first lock server sends an obtaining request to each transaction coordinator in the transaction coordinator list.

After obtaining the address information of each transaction coordinator in the transaction coordinator list, the first lock server sends the obtaining request to each transaction coordinator in the transaction coordinator list, where the obtaining request is used to obtain lock data in each transaction coordinator that receives the obtaining request. The lock data in each transaction coordinator includes lock data of one or more distributed transactions processed by the transaction coordinator.

S403: Each transaction coordinator that receives the obtaining request sends respective lock data to the first lock server.

After receiving the obtaining request of the first lock server, a first transaction coordinator obtains lock data in the first transaction coordinator, and sends the lock data to the first lock server, where the first transaction coordinator is any transaction coordinator in the transaction coordinator list.

In a possible implementation, as shown in FIG. 3A and FIG. 3B, to improve efficiency of a lock server in processing a lock request, a plurality of lock servers is divided into a plurality of partitions, and each partition includes one primary lock server and a plurality of secondary lock servers. After receiving the lock data, the transaction coordinator selects one partition based on a load balancing policy and sends the lock data to the primary lock server of the one partition to implement locking. After receiving the obtaining request, the first transaction coordinator sends, to the first lock server, the lock data that is in the first transaction coordinator and is previously sent to the first lock server.

S404: The first lock server determines whether the lock data returned by each transaction coordinator in the transaction coordinator list is obtained. If the lock data returned by each transaction coordinator in the transaction coordinator list is not obtained, S405 is performed, or if the lock data returned by each transaction coordinator in the transaction coordinator list is obtained, S406 is performed.

S405: When obtaining no lock data in a second transaction coordinator, the first lock server sends the obtaining request to a third transaction coordinator, and after the first lock server receives the lock data in the second transaction coordinator sent by the third transaction coordinator, S406 is performed.

The third transaction coordinator is a secondary node of the second transaction coordinator, and includes the lock data in the second transaction coordinator. When receiving no lock data returned by the second transaction coordinator, the first lock server sends the obtaining request to the third transaction coordinator that backs up the lock data in the second transaction coordinator, to obtain the lock data included in the second transaction coordinator. After the first lock server receives the lock data sent by the third transaction coordinator, S406 is performed. The second transaction coordinator is any transaction coordinator in the transaction coordinator list.

S406: After obtaining the lock data of each transaction coordinator in the transaction coordinator list, the first lock server notifies each transaction coordinator in the transaction coordinator cluster that the first lock server is the primary lock server.

After obtaining the lock data sent by each transaction coordinator in the transaction coordinator list, the first lock server constructs full lock data in a memory of the first lock server, where the full lock data includes the lock data included in each transaction coordinator in the transaction coordinator list.

After obtaining the lock data of each transaction coordinator in the transaction coordinator list, the first lock server sends a first indication message to each transaction coordinator in the transaction coordinator cluster, where the first indication message is used to notify each transaction coordinator that the first lock server is the primary lock server in the lock server cluster. The primary lock server is configured to process an acquire lock request, an unlock request, and a lock query request of each transaction coordinator in the transaction coordinator cluster. When each transaction coordinator in the coordination server cluster needs to perform locking, unlocking, or lock querying, each transaction coordinator in the coordination server cluster sends the acquire lock request, the unlock request, or the lock query request to the primary lock server.

It should be noted that if failing to obtain the lock data of each transaction coordinator in the transaction coordinator list, the first lock server cannot obtain the full lock data. To prevent an error in the first lock server when the first lock server receives the acquire lock request, the unlock request, or the lock query request sent by the transaction coordinators, the lock server cluster re-elects the candidate primary lock server of the lock server cluster based on the preset algorithm. For example, the second lock server in the lock server cluster is elected as the candidate primary lock server, and the candidate primary lock server obtains the lock data based on the method in S401 to S406, to determine whether to become the primary lock server.

In a possible implementation, after the first lock server becomes the primary lock server, the first lock server sends a heartbeat packet to another lock server at a preset time interval. Any lock server receives, within first preset duration, no heartbeat packet sent by the first lock server, the any lock server sends a selection request to another lock server to re-initiate an election, and the plurality of lock servers in the lock server cluster re-elect the candidate primary lock server of the lock server cluster in the partition based on preset algorithm. For example, the second lock server in the lock server cluster is elected as the candidate primary lock server, and the second lock server obtains the lock data based on the method in S401 to S406 to determine whether to become the primary lock server, where the first preset duration is greater than the preset time interval.

According to the method in this embodiment of this disclosure, the lock server cluster is used in the distributed system to replace the Redis or a database. Each lock server cluster includes one primary lock server and a plurality of secondary lock servers. In each lock server cluster, the primary lock server processes the acquire lock request, the unlock request, the lock query request, and the like in the system, and stores the lock data obtained through locking or unlocking in a storage area, for example, the memory, of the primary lock server, without backing up the lock data. Therefore, the lock data in the secondary node does not need to be updated each time after an acquire lock operation or an unlock operation is performed, reducing performance consumption in a distributed transaction processing process. In addition, it is unnecessary to return an acquire lock result or an unlock result to a database server only after lock data in a secondary node is updated each time locking or unlocking is performed. Therefore, a delay in the distributed transaction processing process can be reduced, holding time of a transaction lock can be reduced, and transaction processing efficiency can be improved. In addition, the transaction coordinator list is maintained in the primary lock server. The transaction coordinator list records a transaction coordinator to which the lock data stored in the primary lock server belongs. After updating the transaction coordinator list each time, the primary lock server synchronizes the updated transaction coordinator list to the secondary lock server. In this way, when the primary lock server is faulty in the lock server cluster, a newly elected primary lock server can obtain the lock data from the transaction coordinator based on the transaction coordinator list, and quickly recover the full lock data in the primary lock server when a fault occurs.

Figure 5:
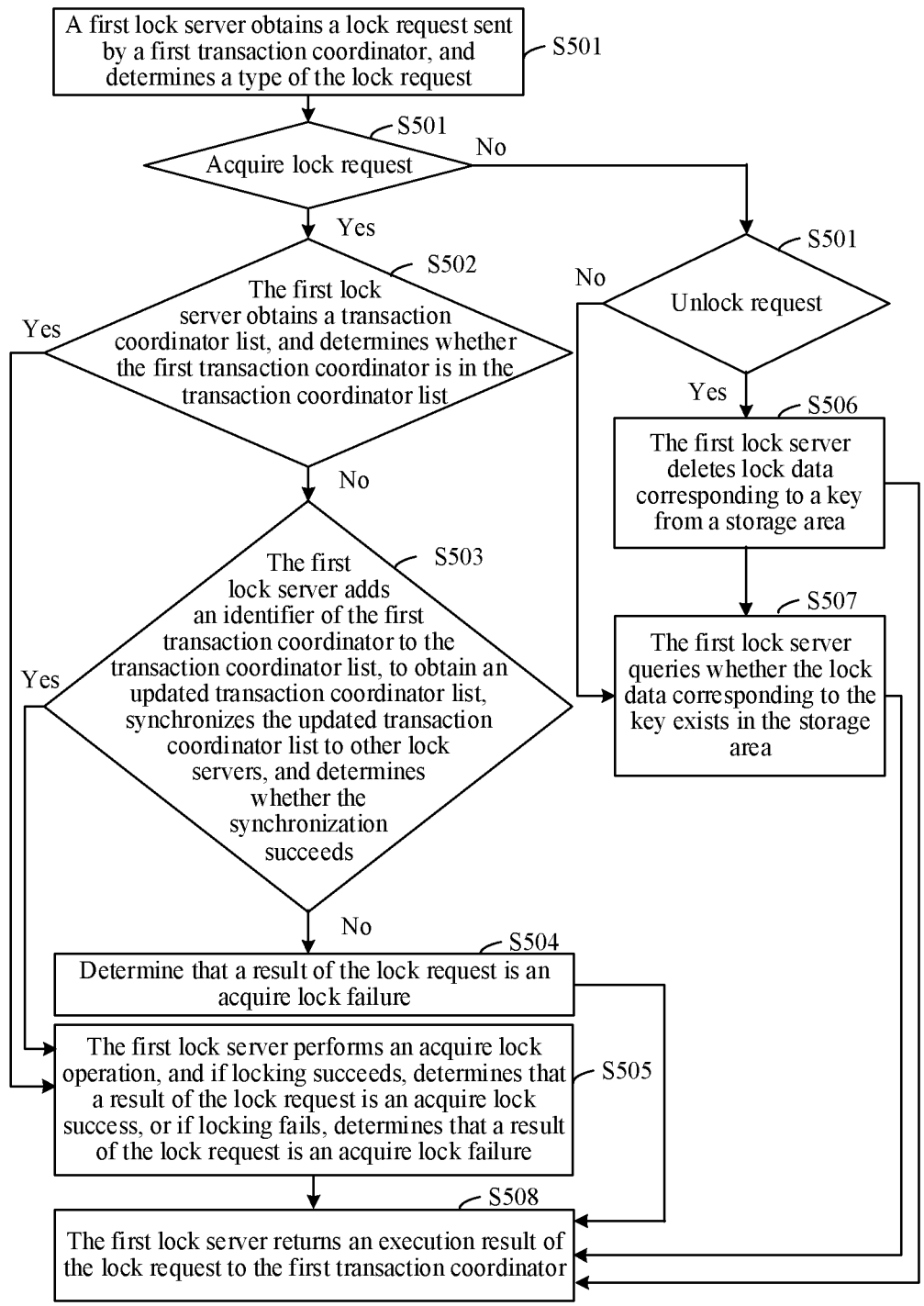
FIG. 5 is a schematic flowchart of a lock request processing method according to an embodiment of this disclosure.

After the primary lock server in the lock server cluster is determined based on the foregoing method, the primary lock server processes the acquire lock request, the unlock request, and the lock query request that are sent by the transaction coordinator. A lock request processing method provided in the following embodiment of this disclosure is described by using an example in which the first lock server is the primary lock server in the partition. FIG. 5 is a schematic flowchart of a lock request processing method according to an embodiment of this disclosure.

S501: A first lock server obtains a lock request sent by a first transaction coordinator, and determines a type of the lock request, and if the lock request is an acquire lock request, performs S502, if the lock request is an unlock request, performs S506, or if the lock request is a lock query request, performs S507.

The type of the lock request includes the acquire lock request, the unlock request, and the lock query request. The lock request includes the foregoing lock data. The acquire lock request indicates the first lock server to perform an acquire lock operation. The acquire lock operation refers to storing the lock data in the lock request. When another transaction needs to operate data that is in a database and that is indicated by the lock data, the data is also locked. If the lock data has already existed in a lock server, the other transaction fails in locking and cannot perform an operation on the data. This prevents a conflict when concurrent transactions perform the operation on a same row of data. The unlock request indicates the first lock server to perform an unlock operation, where the unlock operation refers to deleting the lock data in the lock server.

S502: When the lock request is the acquire lock request, the first lock server obtains a transaction coordinator list, determines whether the first transaction coordinator is in the transaction coordinator list. If the first transaction coordinator is not in the transaction coordinator list, S503 is performed, or if the first transaction coordinator is in the transaction coordinator list, S505 is performed.

The transaction coordinator list includes an ID of each transaction coordinator, for example, an Internet Protocol (IP) address of the transaction coordinator. The first lock server matches the ID in the transaction coordinator list based on an ID of the first transaction coordinator that sends the acquire lock request. If there is no ID of the first transaction coordinator in the transaction coordinator list, it is determined that there is no first transaction coordinator in the transaction coordinator list, and an operation in S503 is performed. If there is the ID of the first transaction coordinator in the transaction coordinator list, it is determined that there is the first transaction coordinator in the transaction coordinator list, and an operation in S505 is performed.

S503: The first lock server adds the ID of the first transaction coordinator to the transaction coordinator list to obtain an updated transaction coordinator list, and synchronizes the updated transaction coordinator list to other lock servers in a lock server cluster. If the updated transaction coordinator list is unsuccessfully synchronized to a preset proportion of lock servers in the other lock servers, S504 is performed, or if the updated transaction coordinator list is successfully synchronized to the preset proportion of lock servers in the other lock servers in a partition, S505 is performed.

After the first lock server adds the ID of the first transaction coordinator to the transaction coordinator list to obtain the updated transaction coordinator list, the first lock server sends the updated transaction coordinator list to the other lock servers. If receiving no acknowledgment message returned by the preset proportion of lock servers in the other lock servers, and determining that the updated transaction coordinator list is unsuccessfully synchronized to the other lock servers, the first lock server performs an operation in S504. If receiving acknowledgment messages returned by lock servers whose proportion is greater than or equal to the preset proportion in the other lock servers, and determining that the updated transaction coordinator list has been successfully synchronized to the other lock servers, the first lock server performs an operation in S505.

S504: If determining that the updated transaction coordinator list is unsuccessfully synchronized to the preset proportion of lock servers in the other lock servers, the first lock server determines that a result of the lock request is an acquire lock failure, and then performs S508 to return an execution result of the lock request.

When receiving the acquire lock request but unsuccessfully synchronizing the updated transaction coordinator list to the other lock servers, the first lock server does not perform the acquire lock operation, and sends a returned message indicating the acquire lock failure to the transaction coordinator that sends the acquire lock request. In addition, the ID of the first transaction coordinator is deleted from the updated transaction coordinator list.

In a possible implementation, the preset proportion may be 1. In this case, if unsuccessfully synchronizing the updated transaction coordinator list to all the other lock servers, the first lock server determines the acquire lock failure. This avoids that when the first lock server is faulty, obtained lock data is incomplete because a transaction coordinator list in a newly elected primary lock server is not updated.

S505: The first lock server performs the acquire lock operation, and if locking succeeds, determines that a result of the lock request is an acquire lock success, or if locking fails, determines that a result of the lock request is an acquire lock failure, and performs S508 to return the execution result of the lock request.

After determining that the updated transaction coordinator list is synchronized to the preset proportion of lock servers in the other lock servers in the partition, the first lock server searches full lock data for a key in the lock request. If there is no key in the lock request, the first lock server performs the acquire lock request, and stores the lock data in the lock request into a storage area of the lock server. If there is the key in the lock request, it indicates that lock data corresponding to the key exists. Then, a value of the lock data in the lock request is compared with a value of the key in the first lock server. If the values are the same, it indicates that a lock to be added to the lock request has already existed. If the values are different, it indicates that another transaction locks the data and the lock request fails in locking.

S506: When the lock request is the unlock request, the first lock server deletes the lock data corresponding to the key from the storage area, and performs S508 to return the execution result of the lock request.

S507: When the lock request is the lock query request, the first lock server queries whether the lock data corresponding to the key exists in the storage area, and performs S508 to return the execution result of the lock request.

S508: The first lock server returns the execution result of the lock request to the first transaction coordinator.

In a possible implementation, if all locks applied for by one transaction coordinator are released, and the transaction coordinator does not send a new acquire lock request to the primary lock server within second preset duration, the first lock server deletes an ID of the transaction coordinator from the transaction coordinator list.

It should be noted that for ease of description, the foregoing method embodiment is described as a series of action combinations. However, a person skilled in the art should understand that the present disclosure is not limited by a described action sequence. In addition, the person skilled in the art should also understand that all embodiments described in this specification are preferred embodiments, and actions mentioned are not necessarily needed for the present disclosure.

Another appropriate step combination that the person skilled in the art can figure out based on the content described above also falls within the protection scope of the present disclosure. In addition, the person skilled in the art should also understand that all embodiments described in this specification are preferred embodiments, and the actions mentioned are not necessarily needed for the present disclosure.

The foregoing describes in detail the lock request processing method provided in embodiments of this disclosure with reference to FIG. 1 to FIG. 5. The following describes a distributed transaction processing apparatus and a computing device provided in embodiments of this disclosure with reference to FIG. 6 and FIG. 7.

Figure 6:
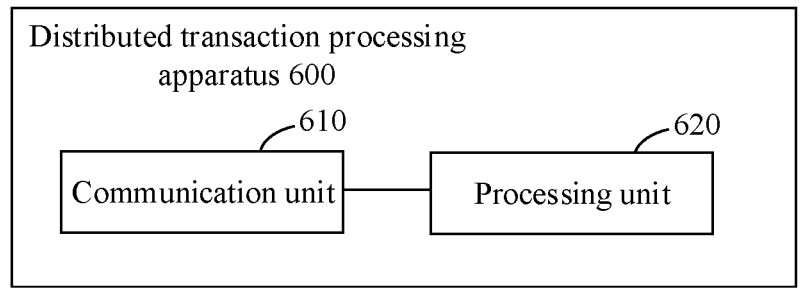
FIG. 6 is a schematic diagram of a distributed transaction processing apparatus according to an embodiment of this disclosure.

FIG. 6 is a schematic diagram of a distributed transaction processing apparatus according to an embodiment of this disclosure. The distributed transaction processing apparatus 600 is configured for any lock server in the lock server cluster in the foregoing distributed system. The distributed system includes a lock server cluster and a transaction coordinator cluster. A transaction coordinator in the transaction coordinator cluster is configured to control a distributed transaction processing process. The distributed transaction processing process includes a lock operation of a database related to a distributed transaction. The apparatus includes a communication unit 610 and a processing unit 620.

The communication unit 610 is configured to send a request for obtaining a lock data to each transaction coordinator in a transaction coordinator list.

The processing unit 620 is configured to: after a first lock server obtains the lock data sent by each transaction coordinator in the transaction coordinator list, process a lock request sent by a transaction coordinator in the transaction coordinator cluster. The first lock server is any lock server in the lock server cluster.

It should be understood that the processing unit 620 in this embodiment of this disclosure may be implemented by using a central processing unit (CPU), an application-specific integrated circuit (ASIC), or a programmable logic device (PLD). The PLD may be a complex programmable logic device (CPLD), a field-programmable gate array (FPGA), a generic array logic (GAL), or any combination thereof. Alternatively, when distributed transaction processing methods shown in FIG. 4 and FIG. 5 may be implemented by using software, the distributed transaction processing apparatus 600 and each unit thereof may also be software modules.

For implementing distributed transaction processing operations by the distributed transaction processing apparatus 600, refer to operation steps of the methods performed by first lock servers in FIG. 4 and FIG. 5 in the foregoing method embodiments. Details are not described herein again.

Figure 7:
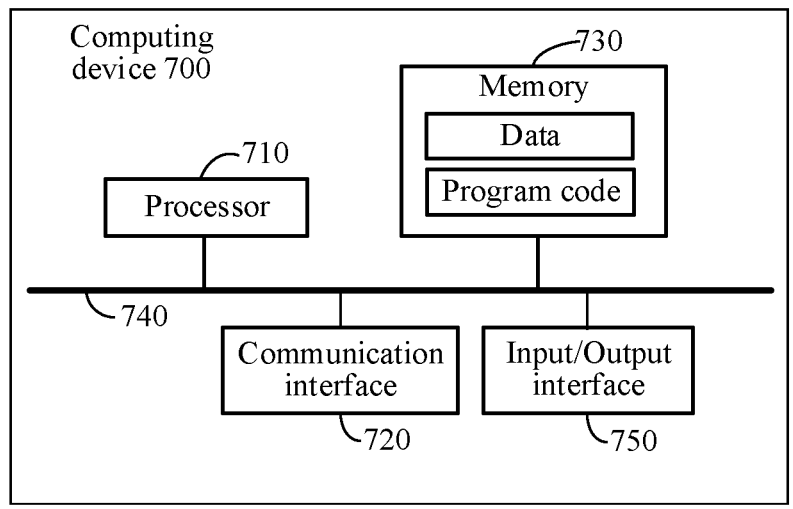
FIG. 7 is a schematic diagram of a computing device according to an embodiment of this disclosure.

FIG. 7 is a schematic diagram of a structure of a computing device according to an embodiment of this disclosure. The computing device 700 includes a processor 710, a communication interface 720, and a memory 730. The processor 710, the communication interface 720, and the memory 730 are connected to each other by using the bus 740. The processor 710 is configured to invoke program code stored in the memory 730 to perform operations performed by first lock servers in FIG. 4 and FIG. 5.

The processor 710 may have a plurality of specific implementation forms. For example, the processor 710 may be any processor or a combination of processors, such as a CPU, a graphics processing unit (GPU), and a tensor processing unit (TPU). The processor 710 may also be a single-core processor or a multi-core processor. The processor 710 may be a combination of the CPU and a hardware chip. The hardware chip may be an ASIC, a PLD, or a combination thereof. The PLD may be a CPLD, an FPGA, a GAL, or any combination thereof. The processor 710 may alternatively be implemented independently by using a logic device with built-in processing logic, for example, the FPGA or a digital signal processor (DSP).

The communication interface 720 may be a wired interface or a wireless interface, and is configured to communicate with another module or device, for example, obtain an acquire lock request from a transaction coordinator, or synchronize a transaction coordinator list. The wired interface may be an Ethernet interface, a controller area network (CAN) interface, or a local interconnect network (LIN) interface, and the wireless interface may be a cellular network interface, a wireless local area network interface, or the like.

The memory 730 includes a non-volatile memory and a volatile memory, for example, a non-volatile memory read-only memory (ROM), a programmable read-only memory (PROM), an erasable programmable read-only memory (EPROM), an electrically erasable programmable read-only memory (EEPROM), or a flash memory. The volatile memory may be a random-access memory (RAM). The memory 730 may be configured to store the program code and data, so that the processor 710 invokes the program code stored in the memory 730 to perform operation steps of the first lock server in FIG. 4 or FIG. 5 in the foregoing method embodiments. In addition, the computing device 700 may include more or fewer assemblies than those shown in FIG. 7, or may have different assembly configuration manners.

The bus 740 may be classified into an address bus, a data bus, a control bus, and the like. For ease of representation, only one bold line is used for representation in FIG. 7, but this does not mean that there is only one bus or only one type of bus.

Optionally, the computing device 700 may further include an input/output interface 750. The input/output interface 750 is connected to an input/output device, and is configured to receive input information and output an operation result.

It should be understood that the computing device 700 in this embodiment of this disclosure may correspond to the distributed transaction processing apparatus 600 in the foregoing embodiment, and may perform operations performed by the distributed transaction processing apparatus or the first lock server in the foregoing method embodiment. Details are not described herein again.

An embodiment of this disclosure further provides a non-transitory computer storage medium. The computer storage medium stores computer program instructions. When the instructions are run on a processor, method steps in the foregoing method embodiments may be implemented. For specific implementation of performing the method steps by the processor of the computer storage medium, refer to specific operations in the foregoing method embodiments. Details are not described herein again.

In the foregoing embodiments, description of each embodiment has a respective focus. For a part that is not described in detail in an embodiment, refer to related descriptions in other embodiments.

All or some of the foregoing embodiments may be implemented by using software, hardware, firmware, or any combination thereof. When the software is used to implement embodiments, the foregoing embodiments may be implemented completely or partially in a form of a computer program product. The computer program product includes one or more computer program instructions. When the computer program instructions are loaded or executed on a computer, all or some of processes or functions according to this embodiment of this disclosure are generated. The computer may be a general-purpose computer, a special-purpose computer, a computer network, or another programmable apparatus. The computer program instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired (coaxial cable, optical fiber, digital subscriber line (DSL)) or wireless (for example, infrared, radio, or microwave) manner. The computer-readable storage medium may be any usable medium accessible by the computer, or a data storage device, such as the server or the data center, integrating one or more usable media. The usable medium may be a magnetic medium (for example, a floppy disk, a hard disk drive, or a magnetic tape), an optical medium, or a semiconductor medium, where the semiconductor medium may be a solid-state drive.

The foregoing descriptions are merely specific implementations of this disclosure. Any variation or replacement figured out by a person skilled in the art based on the specific implementations provided in this disclosure shall fall within the protection scope of this disclosure.

What is claimed is:

1. A method, comprising:
   sending, by a first lock server in a lock server cluster of a distributed system, to transaction coordinators in a transaction coordinator cluster of the distributed system, and based on a transaction coordinator list comprising the transaction coordinators, requests for obtaining lock data;
   processing, by the first lock server, lock requests from the transaction coordinators when obtaining the lock data from the transaction coordinators;
   sending, by the first lock server to a third transaction coordinator in the transaction coordinator list, an obtaining request when not receiving, from a second transaction coordinator in the transaction coordinator list, the lock data, wherein the third transaction coordinator comprises a backup of the lock data in the second transaction coordinator; and
   receiving, by the first lock server and from the third transaction coordinator, the lock data.

2. The method of claim 1, wherein the transaction coordinator list records a first transaction coordinator of the transaction coordinators actively performing a lock operation.

3. The method of claim 1, wherein processing the lock requests comprises:
   receiving, by the first lock server and from a first transaction coordinator of the transaction coordinators, an acquire lock request;
   adding, by the first lock server, an identifier (ID) of the first transaction coordinator to the transaction coordinator list to obtain an updated transaction coordinator list when the transaction coordinator list does not comprise the ID;
   synchronizing, by the first lock server and to second lock servers in the lock server cluster, the updated transaction coordinator list; and
   when the updated transaction coordinator list is successfully synchronized to a preset proportion of the second lock servers:
      performing, by the first lock server and based on the acquire lock request, an acquire lock operation to obtain the lock data; and
      storing, by the first lock server and to a storage area of the first lock server, the lock data.

4. The method of claim 3, wherein when the updated transaction coordinator list is not synchronized to the preset proportion, the method further comprises:
   sending, by the first lock server and to the first transaction coordinator, an acquire lock failure message; and
   deleting the ID from the updated transaction coordinator list.

5. The method of claim 3, wherein when the transaction coordinator list comprises the ID, the method further comprises:
   performing, based on the acquire lock request, the acquire lock operation to obtain the lock data; and
   storing, to the storage area, the lock data.

6. The method of claim 3, wherein the preset proportion of the second lock servers is 0.5.

7. The method of claim 3, wherein the preset proportion of the second lock servers is 1.0.

8. The method of claim 1, wherein before processing the lock requests, the method further comprises sending, by the first lock server and to the transaction coordinators, a first message instructing the transaction coordinators to send the lock requests to the first lock server.

9. The method of claim 1, wherein before sending the requests, the method further comprises not receiving, by the first lock server, from a second lock server, and within a preset duration, a heartbeat packet.

10. The method of claim 1, wherein the first lock server is a candidate primary lock server from the lock server cluster.

11. A system, comprising:
a transaction coordinator cluster comprising transaction coordinators configured to:
control a distributed transaction processing process, wherein the distributed transaction processing process comprises a first lock operation on a database related to a distributed transaction;
send stored lock data; and
send a lock request; and
a lock server cluster comprising a first lock server configured to:
send, based on a transaction coordinator list comprising the transaction coordinators, a request for obtaining lock data to the transaction coordinators;
obtain, from the transaction coordinators, the stored lock data;
process the lock request after obtaining the stored lock data;
send, to a third transaction coordinator in the transaction coordinator list, an obtaining request when not receiving, from a second transaction coordinator in the transaction coordinator list, the lock data, wherein the third transaction coordinator comprises a backup of the lock data in the second transaction coordinator; and
receive, by the first lock server and from the third transaction coordinator, the lock data.

12. The system of claim 11, wherein the lock server cluster further comprises a second lock server configured to synchronize, to the first lock server, the transaction coordinator list, wherein the transaction coordinator list records one of the transaction coordinators actively performing a second lock operation, and wherein before the first lock server sends the request, the second lock server is configured to be a primary lock server that processes the lock request.

13. The system of claim 11, wherein the first lock server is further configured to process the lock request by:
receiving, from a first transaction coordinator of the transaction coordinators, an acquire lock request;
adding an identifier (ID) of the first transaction coordinator to the transaction coordinator list to obtain an updated transaction coordinator list when the transaction coordinator list does not comprise the ID;
synchronizing, to second lock servers in the lock server cluster, the updated transaction coordinator list; and
when the updated transaction coordinator list is successfully synchronized to a preset proportion of the second lock servers:
performing, based on the acquire lock request, an acquire lock operation to obtain the lock data; and
storing, to a storage area of the first lock server, the lock data.

14. The system of claim 13, wherein when the updated transaction coordinator list is not synchronized to the preset proportion, the first lock server is further configured to:
send, to the first transaction coordinator, an acquire lock failure message; and
delete the ID from the updated transaction coordinator list.

15. The system of claim 13, wherein when the transaction coordinator list comprises the ID, the first lock server is further configured to:
perform, based on the acquire lock request, the acquire lock operation to obtain the lock data; and
store, to the storage area, the lock data.

16. The system of claim 11, wherein before the first lock server processes the lock request, the first lock server is further configured to send, to the transaction coordinators, a first message instructing the transaction coordinators to send the lock request to the first lock server.

17. The system of claim 11, wherein before sending the request, the first lock server is further configured to not receive, from a second lock server and within a preset duration, a heartbeat packet.

18. The system of claim 11, wherein the first lock server is a candidate primary lock server selected, based on a preset algorithm, from the lock server cluster.

19. A computer program product comprising instructions stored on a non-transitory computer-readable medium that, when executed by one or more processors, cause an apparatus to:
send, by a first lock server in a lock server cluster of a distributed system, to transaction coordinators in a transaction coordinator cluster of the distributed system, and based on a transaction coordinator list comprising the transaction coordinators, requests for obtaining lock data;
process, by the first lock server, lock requests from the transaction coordinators when obtaining the lock data from the transaction coordinators;
send, by the first lock server to a third transaction coordinator in the transaction coordinator list, an obtaining request when not receiving, from a second transaction coordinator in the transaction coordinator list, the lock data, wherein the third transaction coordinator comprises a backup of the lock data in the second transaction coordinator; and
receive, by the first lock server and from the third transaction coordinator, the lock data.

20. The computer program product of claim 19, wherein before processing the lock requests, the one or more processors further cause the apparatus to send, by the first lock server and to the transaction coordinators, a first message instructing the transaction coordinators to send the lock requests to the first lock server.

* * * * *